United States Patent [19]

Nagai

[11] Patent Number: 5,394,073
[45] Date of Patent: Feb. 28, 1995

[54] CHARGING DEVICE

[75] Inventor: Michio Nagai, Tokyo, Japan

[73] Assignee: NEC Corporation, Tokyo, Japan

[21] Appl. No.: 168,922

[22] Filed: Dec. 16, 1993

Related U.S. Application Data

[63] Continuation of Ser. No. 859,659, Mar. 30, 1992, abandoned.

[30] Foreign Application Priority Data

Mar. 29, 1991 [JP] Japan .................................. 3-091125

[51] Int. Cl.⁶ .................................... H01M 10/46
[52] U.S. Cl. .................................... 320/2; 429/96
[58] Field of Search .................... 320/2, 28; D13/103, D13/107, 108; 429/96, 97, 98, 99, 100

[56] References Cited

U.S. PATENT DOCUMENTS

| D. 334,012 | 3/1993 | Chen | D13/103 |
|---|---|---|---|
| 3,519,914 | 9/1967 | Takayuki et al. | 320/2 |
| 4,225,814 | 9/1980 | Gantz et al. | 320/2 |
| 4,629,962 | 12/1986 | Arakawa | 320/2 |
| 4,684,870 | 8/1987 | George et al. | 320/20 |
| 4,710,693 | 12/1987 | Wigell | 320/2 |

Primary Examiner—Steven L. Stephan
Assistant Examiner—Rob Nappi
Attorney, Agent, or Firm—Ostrolenk, Faber, Gerb & Soffen

[57] ABSTRACT

A charging unit for charging a power source incorporated in a portable radio apparatus or similar apparatus. The unit includes a tray which is movable between a mounting position and a connecting position while carrying the apparatus thereon. When the apparatus is attached to and detached from the charging unit, it is substantially free from disfigurement including scratches since only the tray is moved.

8 Claims, 3 Drawing Sheets

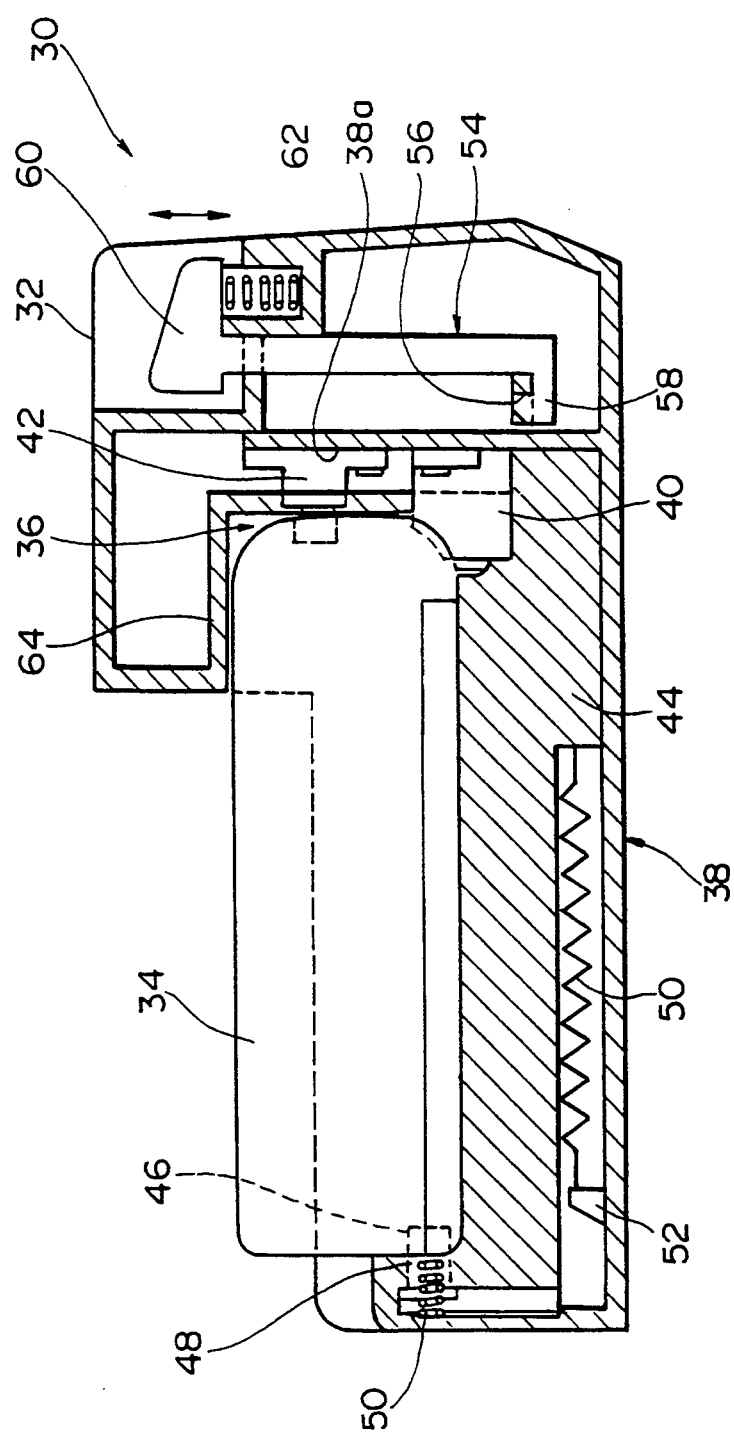

CHARGING DEVICE

This is a continuation of application Ser. No. 07/859,659, filed on Mar. 30, 1992, now abandoned.

BACKGROUND OF THE INVENTION

The present invention relates to a charging unit for charging a rechargeable power source incorporated in an apparatus and, more particularly, to a charging unit capable of charging a rechargeable power source in the form of a battery incorporated in a portable radio apparatus without scratching or otherwise disfiguring the apparatus.

A portable radio apparatus extensively used today is powered by a rechargeable battery incorporated therein. The rechargeable battery has to be charged when it runs out of power. To charge such a battery, use is made of a charging unit of the type allowing the radio apparatus with the battery to be bodily mounted thereon in a chargeable position. A conventional charging unit has a body for mounting the apparatus accommodating the battery to be charged. The charging unit has a recess for receiving the apparatus and locking portions at both sides of the recess while the apparatus has grooves on both sides thereof. When the locking portions are mated with the grooves, the apparatus is fixed in place on the unit body. Unlock buttons are provided on opposite sides of the unit body, and each is interlocked with respective one of the locking portions. When the unlock buttons are pressed, the locking portions are moved out of the grooves. Then, the apparatus is thrusted toward the outside of the recess by a thrust plate and then removed from the charging unit while sliding on the unit body.

As stated above, when the apparatus is to be removed from the charging device, it has to be slid out of the recess of the charging unit. It is likely, therefore, that both the apparatus and the recess of the unit are scratched due to the friction acting between the inner periphery of the recess and the outer periphery of the apparatus.

SUMMARY OF THE INVENTION

It is therefore an object of the present invention to provide a charging unit which allows a portable radio apparatus or similar apparatus to be mounted thereon for charging a power source thereof without scratching or otherwise disfiguring the apparatus.

A charging unit for charging a body to be charged incorporated in an apparatus of the present invention comprises a charging section connectable to the body for charging the body, a tray for carrying the body and movable between a mounting position for mounting the body thereon and a connecting position for connecting the body to the charging section, and a locking section for releasably locking the tray in the connecting position.

BRIEF DESCRIPTION OF THE DRAWINGS

The above and other objects, features and advantages of the present invention will become more apparent from the following detailed description taken with the accompanying drawings in which:

FIG. 4 is a section demonstrating the operation of the embodiment.

DESCRIPTION OF THE PREFERRED EMBODIMENT

Figure 1:
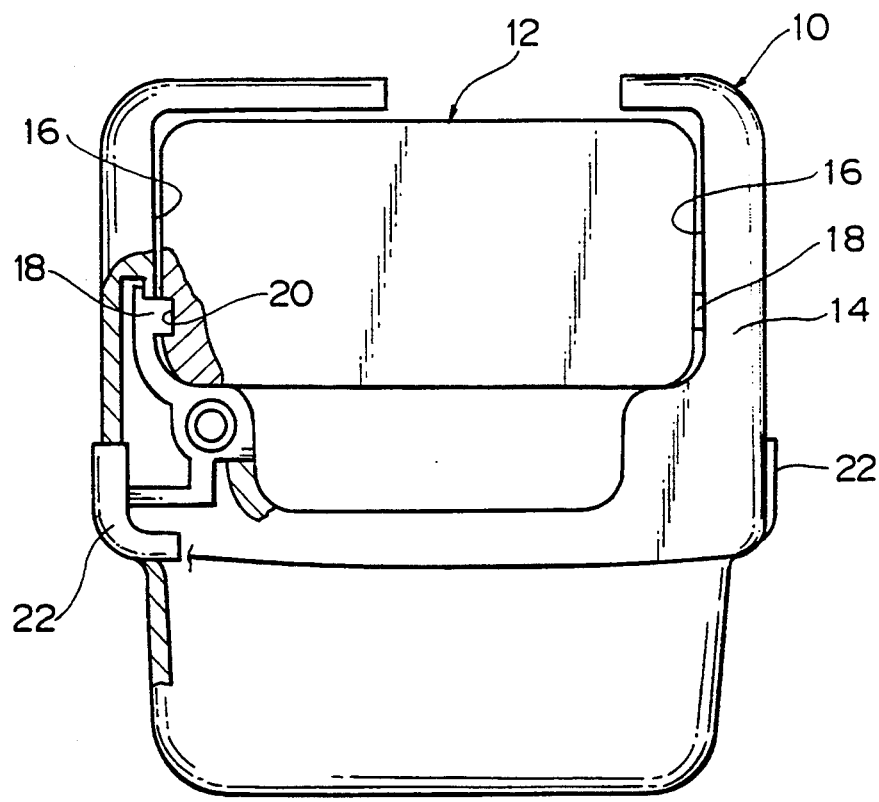
FIG. 1 is a partly sectional plan view of a conventional charging unit.
Figure 2:
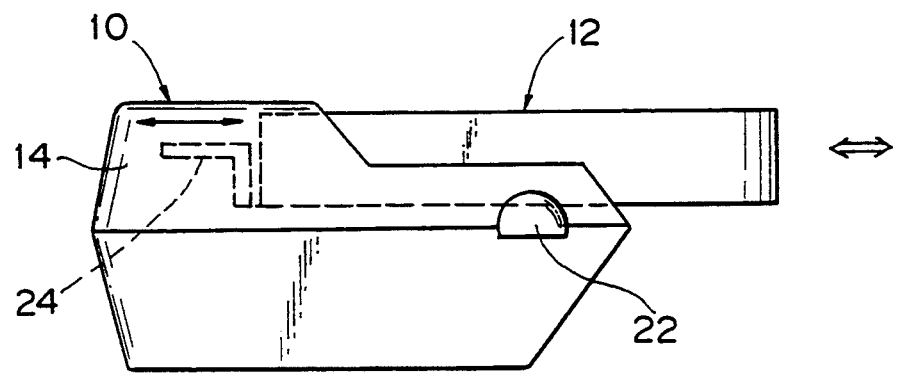
FIG. 2 is a side elevation of the conventional charging unit.

To better understand the present invention, a brief reference will be made to a conventional charging unit, shown in FIGS. 1 and 2. As shown, the charging unit, generally 10, has a body 14 for mounting a portable radio apparatus 12 which accommodates a battery to be charged therein. The charging unit 10 has a recess 16 for receiving the entire apparatus 12, and locking portions 18 on the inner periphery of opposite sides of the recess 16. Grooves 20 are provided on the outer periphery of opposite sides of the apparatus 12. When the locking portions 18 are respectively mated with the grooves 20, the apparatus 12 is fixed in place on the unit body 14. Unlock buttons 22 are positioned on the outer periphery of opposite sides of the body 14, and each is interlocked with a respective one of the locking portions 18. When the unlock buttons 22 are pressed, the locking portions 18 are moved out of the grooves 20. Then, the apparatus 12 is thrusted toward the outside of the recess 16 by a thrust plate 24 and then removed from the charging unit 10 while sliding on the unit body 14.

As stated above, when the radio apparatus 12 is to be removed from the charging unit 10, it has to be slid out of the recess 16 of the unit 10. It is likely, therefore, that both the apparatus 12 and the recess 16 of the charging unit 10 are scratched due to the friction acting between the inner periphery of the recess 16 and the outer periphery of the apparatus 12.

Figure 3:
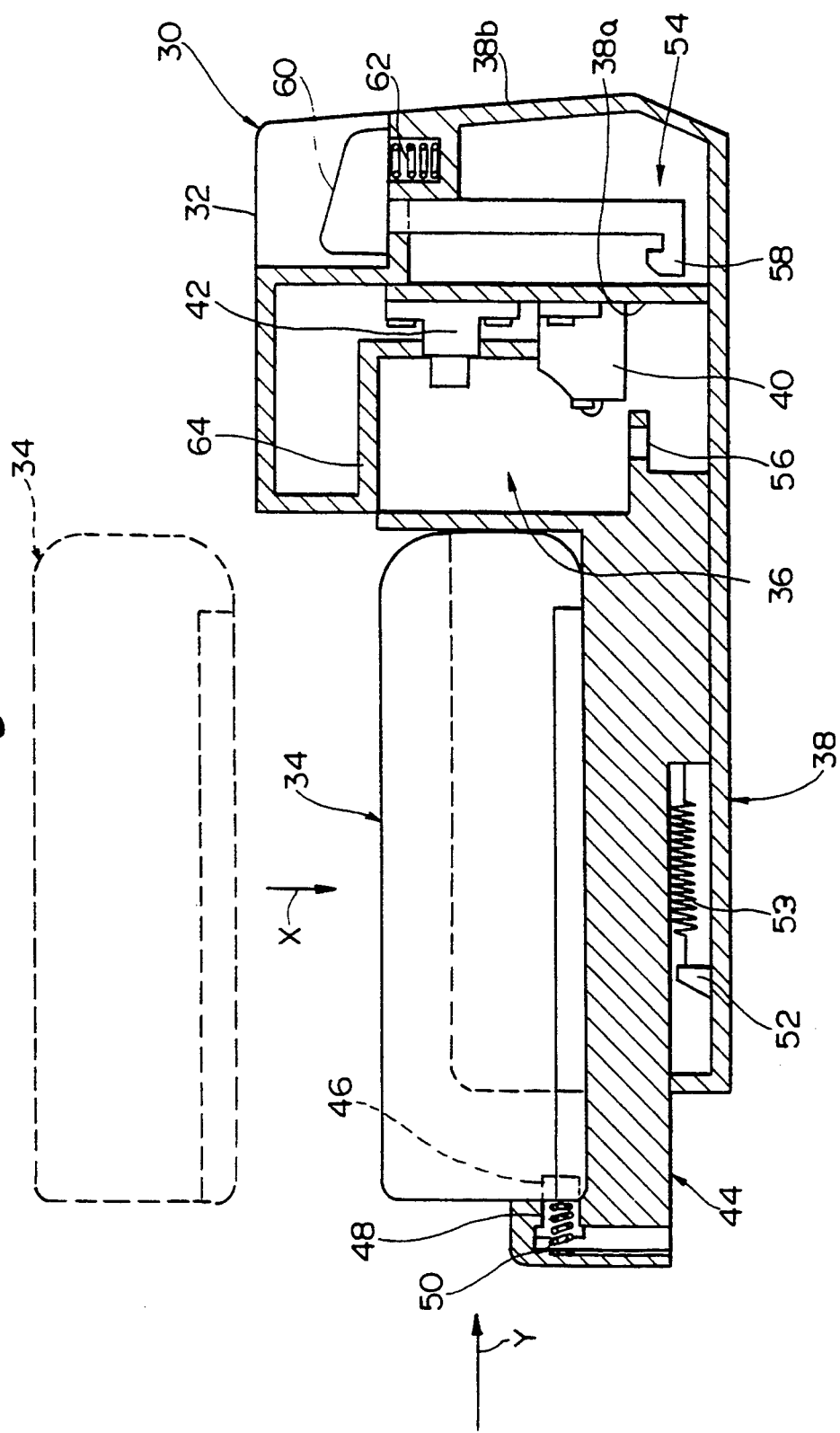
FIG. 3 is a section showing a charging unit embodying the present invention.

Referring to FIG. 3, a charging unit embodying the present invention is shown and generally designated by the reference numeral 30. As shown, the charging unit 30 has a body 32 which includes a charging section 36 for charging a battery incorporated in a portable radio apparatus 34. A base plate 38 forms part of the unit body 32 and includes an upright wall 38a in a rear portion thereof. The charging section 36 has a signal connector 40 and an antenna connector 42 affixed to the upright wall 38a of the base plate 38. Of course, the apparatus 34 has terminals to mate with the connectors 40 and 42. The charging unit 30 further includes a tray 44 for mounting the radio apparatus 34 thereon. The tray 44 is supported by the base plate 38 in such a manner as to be slidable between a mounting position shown in FIG. 3 and a connecting position shown in FIG. 4. In the mounting position, the apparatus 34 is laid on the tray 44 while, in the connecting position, it is connected to the signal connector 40 and antenna connector 42. A contact pin 48 is received in a front end portion of the tray 44 and constantly biased by a coil spring 50 to contact a contact terminal 46 provided on the apparatus 34. A coil spring 53 is anchored at one end thereof to a lug 52 extending from the base plate 38 and the other end to the tray 44, constantly biasing the tray 44 toward the mounting position (FIG. 3).

A wall 38b covers the upright wall 38a of the unit body 25 32 and includes a locking section 54 for releasably locking the tray 44 in the connecting position. The locking section 54 has a lock button 60 including a lug 58 which is movable into and out of a hole 56 formed through the front end of the tray 44, as will be described. The lock button 60 is constantly biased by a coil spring 62 such that the lug 58 tends to mate with the hole 56 of the tray 44. A cover plate 64 covers the signal connector 40 and antenna connector 42 as well as the end of the radio apparatus 34. The charging unit 30 is connected to a suitable power source, not shown.

To mount the radio apparatus 34 on the charging unit 30, the apparatus 34 is placed on the tray 44 in a direction indicated by an arrow X in FIG. 3. At this instant, the apparatus 34 presses the contact pin 48 against the action of the coil spring 50. As the apparatus 34 is fully mounted on the tray 44, the contact pin 48 is brought into contact with the contact terminal 46 of the apparatus 34 by the coil spring 50. Subsequently, the tray 44 carrying the apparatus 34 thereon is slid into the unit body 32 in a direction indicated by an arrow Y in FIG. 3. A resilient force counteracting the movement of the apparatus 34 in the direction Y is accumulated in the coil spring 53 which is anchored to the lug 52 of the unit body 32. The lock button 60 is movable up and down under the action of the coil spring 62. When the tray 44 reaches the position shown in FIG. 4, the lug 58 of the lock button 60 mates with the hole 56 of the tray 44 to lock the tray 44 in such a position. The apparatus 34 is connected to the signal connector 40 and antenna connector 42 and retained by the cover plate 64 of the unit body 32.

To remove the apparatus 34 from the charging unit 30, the lock button 60 is pressed downward against the force of the coil spring 62. Then, the lug 58 is moved out of the hole 54 with the result that the tray 44 is thrusted out of the body 32 by the action of the coil spring 53 in the opposite direction to the direction Y. The apparatus 34 is now ready to be removed from the charging unit 30.

While the embodiment has been shown and described in relation to a portable radio apparatus, it is practicable with any other kind of apparatus so long as it incorporates a rechargeable battery. Although the tray 44 should, of course, be provided with a shape and size matching the application, the modification of the shape and size will be easy for those skilled in the art to perform.

In summary, it will be seen that the present invention provides a charging unit which protects an apparatus to be charged from scratches or similar disfigurement by using a tray which is movable while carrying the apparatus thereon. Specifically, when the apparatus is attached to and detached from the charging unit, it is substantially free from disfigurement including scratches since only the tray is moved.

Various modifications will become possible for those skilled in the art after receiving the teachings of the present disclosure without departing from the scope thereof.

What is claimed is:

1. A charging unit for charging a power source incorporated in a portable radio apparatus, comprising:
   a body having a base plate;
   a tray for supporting the apparatus, said tray being slidably disposed on said base plate;
   a charging section attached to said body, said tray being slidable on said base plate between a mounting position wherein the apparatus can be mounted on said tray, and a connecting position wherein an apparatus mounted on said tray is engaged only with said charging section and said tray for charging said power source, said charging section including a signal connector and an antenna connector, wherein when the tray is in said connecting position the apparatus is engaged only with the charging section and said tray so as to protect the apparatus from damage due to contact with other parts of the charging unit, and terminals of the apparatus mate with said signal and antenna connectors; and
   a locking section for releasably locking said tray in said connecting position.

2. A charging unit as claimed in claim 1, further comprising biasing means for biasing said tray toward said mounting position.

3. A charging unit as claimed in claim 1, wherein said locking section includes a lock button having a lug which mates with a mating portion formed in said tray and releases said mating portion when pressed, and a spring for biasing said lock button to engage said lug and said mating portion.

4. A charging unit for charging a power source incorporated in an apparatus, comprising:
   a body having a base plate;
   a tray for supporting the apparatus, said tray being slidably disposed on said base plate, said tray including a pin for being connected to a terminal of the apparatus;
   a charging section attached to said body and including a signal connector and an antenna connector, said tray being slidable on said base plate between a mounting position wherein the apparatus can be mounted on said tray and a connecting position wherein an apparatus mounted on said tray is engaged only with said charging section and said tray for charging said power source, wherein when the tray is in said connecting position the apparatus is engaged only with the charging section and said tray so as to protect the apparatus from damage due to contact with other parts of the charging unit, and terminals of the apparatus engage with the signal and antenna connectors in said charging section;
   means for biasing said tray toward said mounting position; and
   locking means for releasably locking said tray in said connecting position.

5. A charging unit as claimed in claim 4, wherein said locking means comprise a spring biased button and a lug connected with said button, said lug mating with an opening in said tray.

6. A charging unit as claimed in claim 4, wherein said biasing means comprise a spring mounted between said tray and said base plate.

7. A charging unit as claimed in claim 4, wherein said pin is biased toward the apparatus.

8. A charging unit for charging a power source incorporated in an apparatus, comprising:
   a tray for supporting the apparatus, said tray being slidably mounted on a base plate;
   a charging section attached to said base plate, said tray being slidable on said base plate between a mounting position wherein the apparatus can be mounted on said tray, and a connecting position wherein an apparatus mounted on said tray is engaged only with said charging section and said tray for charging said power source, said apparatus contacting only said charging unit and said tray so as to protect the apparatus from damage due to contact with other parts of the charging unit;
   means for biasing said tray toward said mounting position disposed between said tray and said base plate; and
   locking means for releasably locking said tray in said connecting position, said locking means comprising a spring biased button and a lug connected with said button, said lug mating with an opening in said tray.

* * * * *